INVENTOR
Carl J. Heltzel

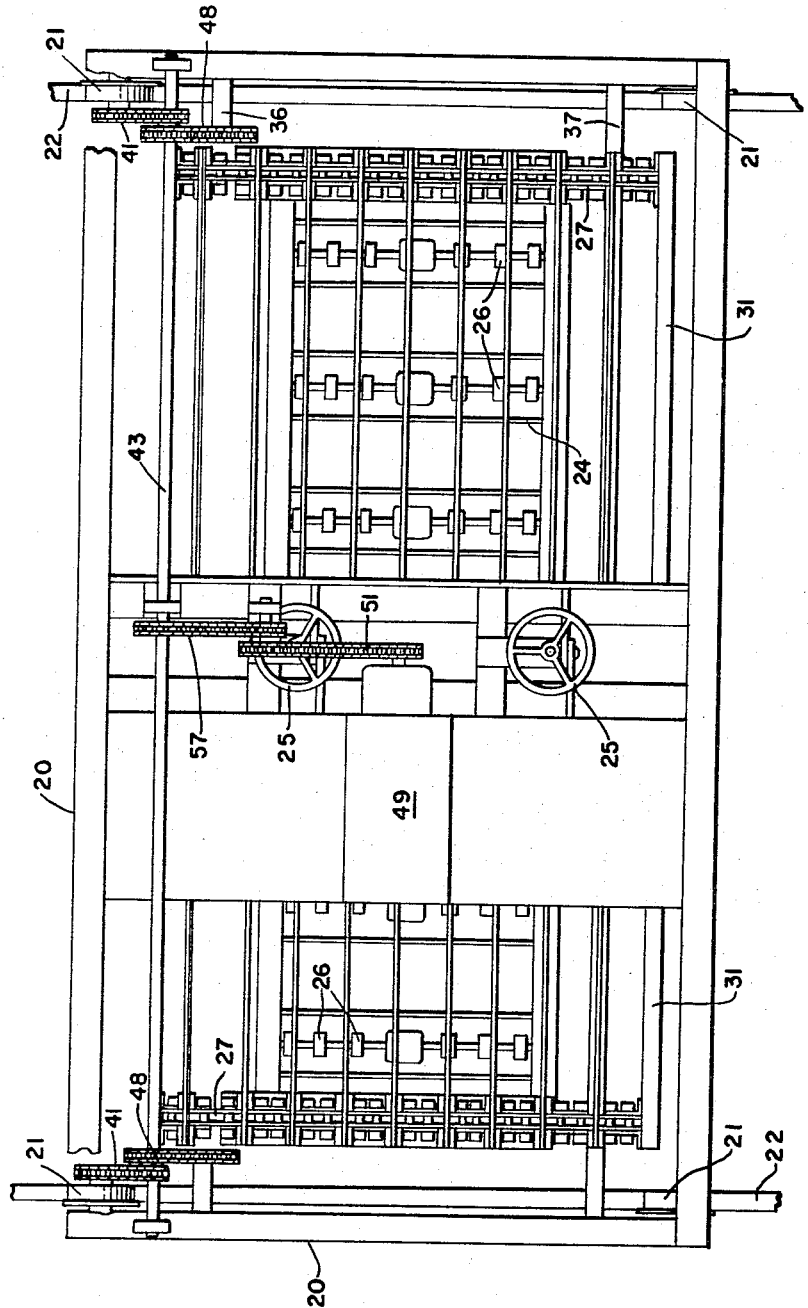

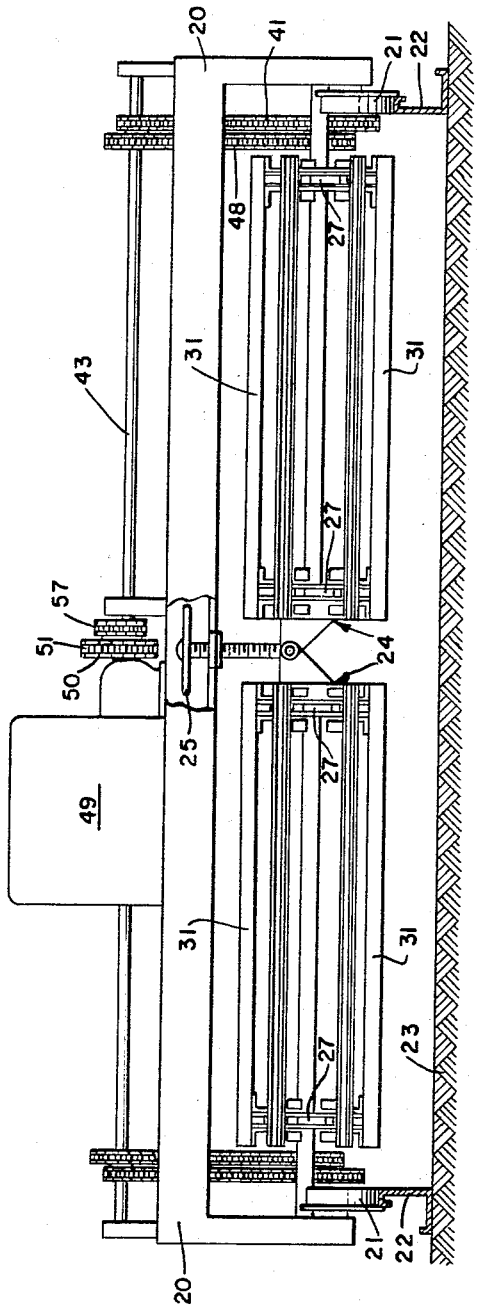
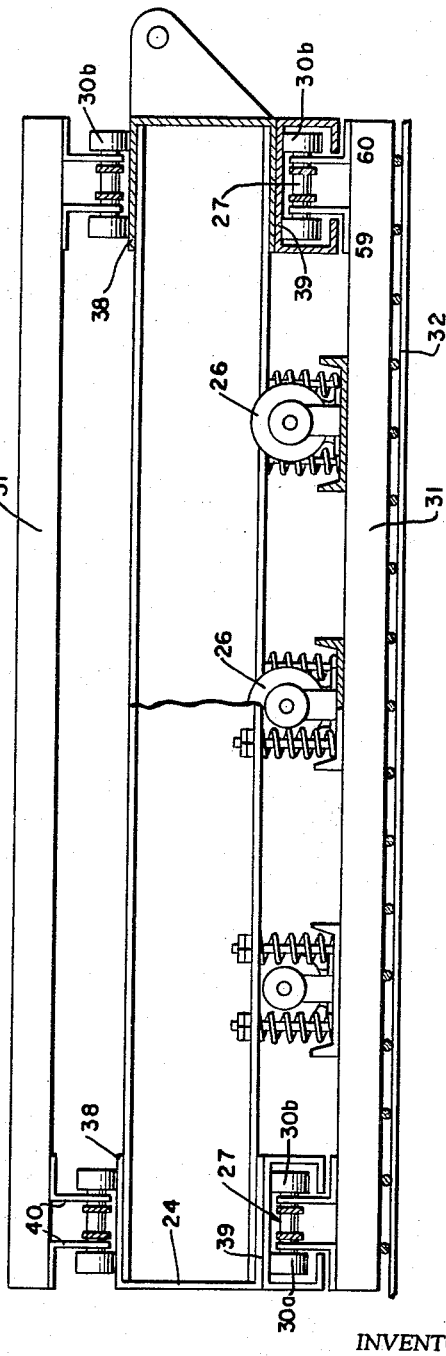

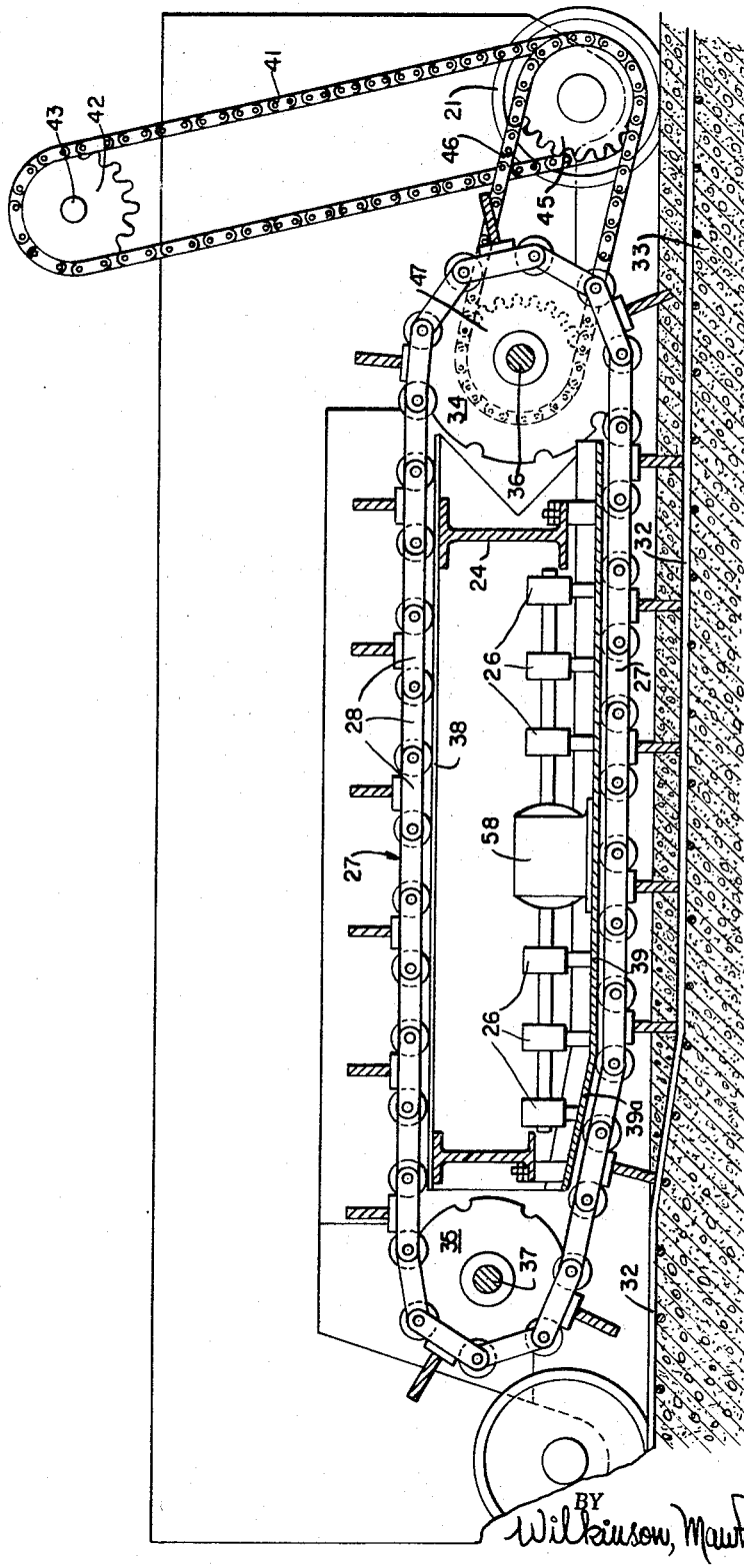

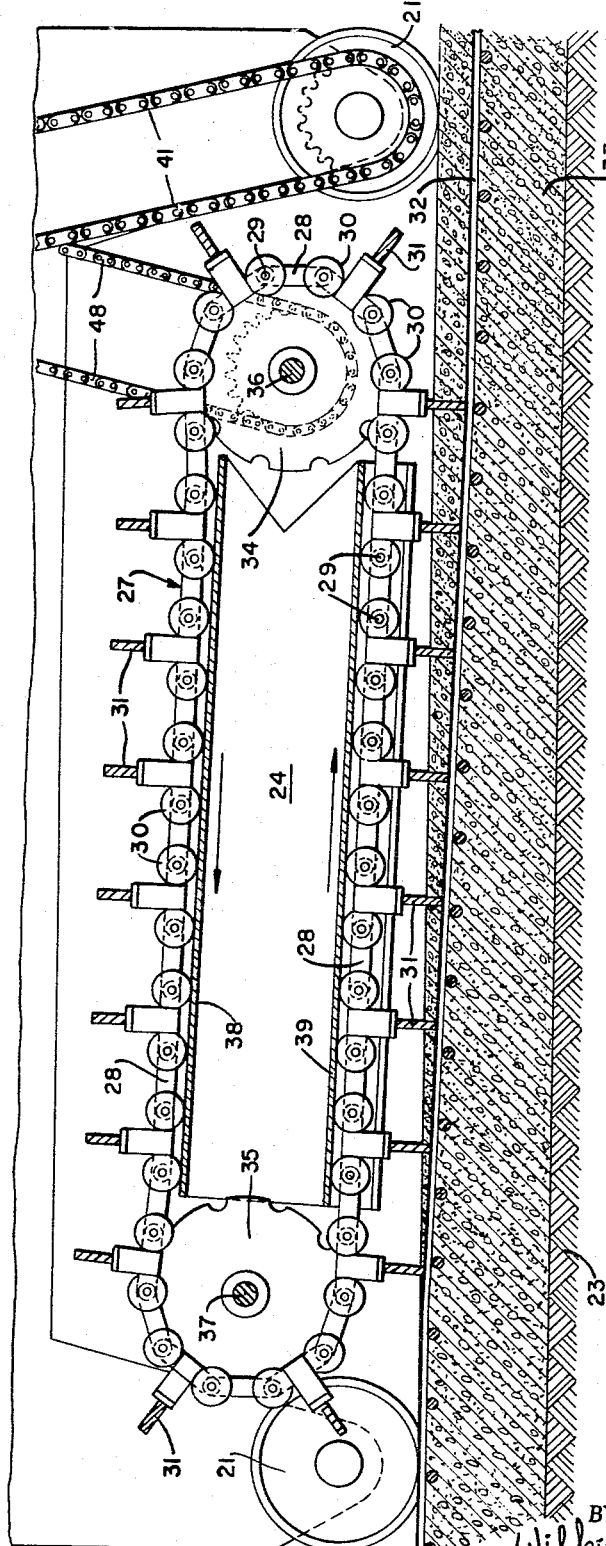

United States Patent Office 3,319,544
Patented May 16, 1967

3,319,544
CONTINUOUS WIRE MESH INSTALLER AND PROCESS FOR INSTALLING WIRE MESH IN PLASTIC CONCRETE
Carl J. Heltzel, 523 Country Club Drive NE., Warren, Ohio 44484
Filed June 4, 1965, Ser. No. 461,358
13 Claims. (Cl. 94—39)

The present invention relates to continuous wire mesh installer and process for installing wire mesh in plastic concrete.

One of the newest procedure operations in concrete paving is the use of a mechanical mesh installer. This device pushes welded wire mesh material from the top surface of a freshly poured concrete slab by vibrating or tamping means a distance of approximately two or three inches beneath the surface.

The old method was to pour concrete and level same within two to three inches of the final top surface. The wire mesh material was then placed on top of the first course and a second course of two to three inches of concrete was poured on top of the mesh material. At times, with high speed paving, the first course had taken its initial set before the second course was laid, causing cold joints or lack of proper adhesion between the two courses. Also there was an extreme disproportionate amount of concrete for the first course and the second course, which would not permit the paving operations to utilize the maximum capacity from all the equipment.

The new method of mechanically installing the wire mesh, as above described, permits all of the concrete to be placed at once to the top of the proposed slab. This procedure eliminates any possibility of cold joints and at the same time permits all the concrete pouring and placing equipment to operate as a single, productive unit rather than requiring a division of two courses.

Up to the present time there have been two methods of mechanically installing the wire mesh material. The one is a continuous method whereby longitudinal runners are sloped so that the front of the runner is above the slab and the back portion is at the proposed final depth of the mesh material in the slab. The runners are then oscillated and continuously moved forward.

There are several objections to this type of operation. All the pressure is exerted on the transverse wires of the mesh material, which are always light wires because they merely act as spacers for tying the longitudinal wires together, and the action of the runners distorts and binds and actually breaks apart the wires, binding the transverse wires to the longitudinal. Also the inherent slipping action of these runners tends to make the mesh material creep forward, which is most undesirable.

The variation in the slump of the concrete also poses a problem for this method inasmuch as the rocking and tamping method should vary with the slump of the concrete mix. Also, the continuous longitudinal runners make it impossible for this type of operation to span an expansion or transverse steel joint if placed on the subgrade in the normal procedure practiced by many States. In this instance it is necessary to stop the machine before reaching such a joint and the concrete mesh material stamped by foot into place, which is not only haphazard and inefficient but is bad connstruction practice as this can tend to dislodge any dowel bars or other devices which might be a part of the construction joint.

The intermittent method of placing the joints consists in the use of a large grid, which is mounted on a frame which spans the road. These grids have transverse and longitudinal bars, which are used to vibrate the mesh material down to the predetermined depth while the machine is at a standstill on the forms. When the proper depth is reached the entire grid is lifted vertically, clearing the concrete surface, and the whole machine is moved forward and the operation repeated.

This method is more satisfactory than the continuous method first mentioned in that there is no creeping of the mesh material, it is more positive as to the depth of placement of the mesh material, and one can also operate the machine and the placing mesh device immediately adjacent to any transverse construction joints which might be placed. The only fault with this method is that it is a stop-and-go operation and there are some objections in using such a device where continuous operation is a must, which would definitely be the case with formless paving, or any arrangement whereby this would become a portion of a complete concrete paving train which would move as a unit.

In a situation where concrete finishing and surfacing equipment would be a portion of the train, it is not advisable to have the train come to a complete standstill as finishing equipment should always be moving forward, even at the slowest possible pace.

It is an object of the present invention to provide a novel method and machine which permits continuous operation in placing and depressing mesh material to a suitable depth in the plastic slab without encountering the difficulties and objections heretofore related as respects either the old continuous or the old intermittent operations.

It is another object of the invention to provide an improved method and machine for placing and depressing mesh material without distortion or breakage of the mesh and without interference with any transverse joints or steel materials in the slab.

It is a further object of the invention to provide a novel method and machine for more speedily laying and installing mesh material in plastic concrete which will speed these operations and more perfectly achieve the end results of securing better reinforced slabs conforming more uniformly to highway specifications.

With the foregoing and other objects in view, the invention will be more fully described hereinafter, and will be more particularly pointed out in the claims appended hereto.

In the drawings, wherein like symbols refer to like or corresponding parts throughout the several views:

FIGURE 1 is a top plan view, with parts broken away, of one form of machine constructed in accordance with the present invention.

FIGURE 2 is a front elevational view of the same showing the incorporation of two installing units.

FIGURE 6 is a longitudinal sectional view, taken on an enlarged scale, of the installing mechanism showing the method of depressing the mesh material into the plastic slab and showing an alternate form of drive.

FIGURE 7 is a view similar to FIGURE 4 showing in edge view the drive arrangement for the device of FIGURE 6.

FIGURE 8 is a longitudinal vertical sectional view similar to FIGURE 6 taken on an enlarged scale showing a somewhat modified form of machine with the type of drive appearing in FIGURES 3, 4 and 5.

FIGURE 9 is a longitudinal vertical sectional view through the installing device showing a further modified construction.

FIGURE 10 is a cross-sectional view taken on the line 10—10 of FIGURE 9.

FIGURE 11 is a side elevational view of a form of machine in which the rear sprockets are of larger diameter than the front sprockets.

FIGURE 12 is a similar view showing both front and rear sprockets of substantially uniform diameter but in which the rear sprockets are disposed at a lower level compared to the front sprockets, thus securing the necessary inclination to install mesh.

Figure 3:
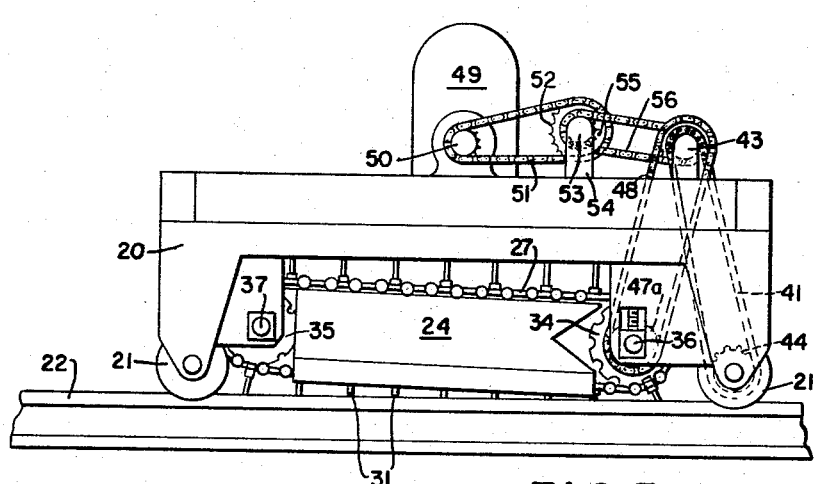
FIGURE 3 is a side elevational view, taken on a reduced scale, showing the machine mounted on side forms.

Referring more particularly to the drawings, 20 designates a main frame which may be supported for forward and backward movement along the roadway on wheels 21, four or more in number, which ride on the side forms 22 which are in the customary manner staked to the subgrade indicated at 23.

It will be understood that the machine could be adapted to formless paving by utilizing continuous, crawler tractor type treads, which would be located at the side of the machine in place of the wheels 21, in which case the side forms 22 would not be required or used.

The main frame 20 carries one or more installing frames 24, of which two are illustrated.

In the plan view, FIGURE 1, will be found an illustration of a full width pavement with the machine symmetrical about the center line and showing the two installing frames 24 extending almost to the side forms 22 and somewhat short of the center line of the roadway. In utilizing two installing frames 24, the frames may be connected at their adjacent ends to adjustable screw devices 25 for adjusting the frames vertically and for crown.

In order to get the proper compaction and to assist in the installation, the frames are preferably continuously vibrated by means of electric or mechanical vibrators 26.

Each installing frame 24 supports an endless installing conveyor involving chains 27, at least two for each installing frame, such chains being comprised of links 28 connected by pivots 29 with rollers 30 at some or all of the pivot joints to minimize friction. Depressing members or bars 31 are mounted to some or all of the links, such bars running the full width of its installing frame 24.

The installing frames 24 are adjustable as to height in the main frame 20, as by the devices 25, so as to bring the depressing bars 31 into a suitable position for pushing the mesh material 32, which has been laid on top of the slab, to the predetermined depth beneath the top of the plastic slab 33, which depth is normally two to three inches. The depressing bars may be of approximately four inches in height as viewed in the lower runs of the conveyors so that there will be ample vertical dimensions of the bars to accomplish the depressing of the mesh material without the chains 27 or the rollers 30 coming into contact with the freshly poured concrete.

The chains travel around rear sprockets 34 and front sprockets 35. For each installing frame 24 there are two front sprockets 35 and two rear sprockets 34 mounted in spaced-apart relation as shown to best advantage in FIGURE 2. The depressing bars 31 span the distance between the two chains and are affixed to the links of the chains in any suitable manner.

The rear sprockets 34 are mounted to rear shafts 36 while the front sprockets 35 are mounted to front shafts 37.

The conveyors are endless comprising upper runs, the rollers 30 of which travel on upper tracks 38 forming parts of the installing frames. The lower runs of the conveyors are disposed below lower tracks 39 under which the rollers 38 travel in contact therewith.

The front and rear sprockets may be of the same diameter, in which event the rear shafts 36 will be at a lower elevation than the front shafts 37 so that the lower runs of the conveyors will travel on a sloping or inclined path from the high ends below the sprockets 35 to the low ends beneath the sprockets 34.

Or, the shafts 36 and 37 may be in substantially the same horizontal plane, in which event the rear sprockets 34 may be of greater diameter than the front sprockets 35 to secure this inclination of the lower runs of the depressing conveyors.

Or, as shown in FIGURE 8, the lower tracks 39 may be on this inclination sloping in a downward direction from front to rear.

Or, as shown in FIGURE 6, sections 39$^a$ of the lower tracks may be sloped downwardly from front to rear while the remainders of the tracks can be at the same or substantially the same horizontal level.

The purpose of the inclination in all cases is to exert thrust upon the depressing members or bars 31 so that they push the mesh 32 downwardly for the required distance into the plastic slab, as illustrated in FIGURES 6 and 8.

The depressing bars or members 31 are fastened to some or all of the links of the chains by the use of angle iron or other connectors 40 (FIGURE 10), but it is realized that many different forms of connectors may be used.

Referring to FIGURE 6, a form of drive for the depressing conveyors is shown in which drive chains 41 powered by sprockets 42 on a power shaft 43 drive sprockets 44 affixed to the rear wheels 21 and in turn, as shown in FIGURE 7, other sprockets 45 driven by the wheels 21 act through chains 46 to drive sprockets 47 affixed to the rear conveyor shafts 36. With this form of drive a single chain 41 for each conveyor suffices and the drive to the conveyors is through the rear wheels 21.

Figure 4:
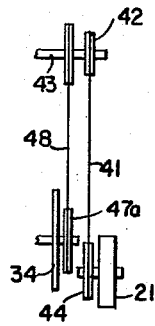
FIGURE 4 is a fragmentary end elevational view taken from the right-hand end of FIGURE 3 showing one method of driving the installing mechanism.

However, as shown in FIGURES 3 and 4, an alternate drive may be used in which the chains 41 drive the rear wheels 21 and the conveyors are driven independently from the power shaft 43 by chains 48 directly coupled to the sprockets 47$^a$. In this case, as shown in FIGURE 4, two chains are required coming from the drive shaft 43 independently of one another, such two chains 41 and 48 individually driving the rear wheels 21 and the rear sprockets 34.

In FIGURES 1, 3 and 5, 49 designates a motor installed upon the main frame for driving the machine and also for driving the installing depressing conveyors. This motor drives a sprocket 50 and through a chain or other transmission 51 drives a sprocket 52 on a stub shaft 53 supported by brackets 54 from the frame. This stub shaft 53 also has affixed thereto a sprocket 55 driving a chain 56 or the like which in turn drives the main drive shaft 43 through an appropriate sprocket 57.

Through this or other drive arrangement the speed of movement of the conveyors is synchronized with the revolution rate of the rear wheels by which the forward travel speed of the machine is determined. This synchronization is such that the forward travel speed of the top runs of the conveyors carrying the depressing members is substantially equal to the forward speed of the machine along the side forms or subgrade. Thus, as the conveyors reverse direction in passing downwardly about the front sprockets 35 into the lower conveyor runs, this retrograde or reverse rearward movement of the lower runs of the conveyors traveling rearwardly at the same speed as the machine is moving forwardly will result in the depressing members or bars 21 remaining in substantially stationary positions during their downward thrust movements. Accordingly, there will be no sliding movement of the depressing members relatively to the mesh material 32 or to the slab.

The depressing bars will be forced downwardly in a vertical direction without having any rear component of movement which might tend to plow up the concrete or disturb the surface thereof or otherwise adversely affect the concrete above the mesh. The installing frames will of course move forwardly being carried in the same motions of translation with the machine as it progresses forwardly along the roadway, and accordingly the inclined lower tracks 39 and/or 39ª will move forward relatively to the stationary installing members 31 having the effect to gradually and progressively exert downward thrust on the members 31 and as the same are in engagement with the mesh material such mesh material will be moved downwardly into the concrete plastic mass to a depth determined by the road construction specifications.

The invention permits continuous operation, that is, continuous forward movement of the machine and continuous action in installing the mesh below the surface of the slabs. The construction eliminates any friction and sliding movement of the mesh, the transverse depressing bars 31 acting directly on the heavy longitudinal bars of the mesh material, eliminating any distortion and breakage of the mesh, and the distance between bars 31 can be regulated in most instances to permit the entire machine to skip over any transverse joints or steel materials in the slab.

FIGURES 6 and 9 illustrate forms of internal vibrators 26 which are mounted in structural members of the installing frames 24 to impart vibration to the depressing members 31, especially as these members travel on the undersides of the frames when they are in contact with the mesh.

These vibrators are also shown in FIGURE 10. The vibrators may be driven by electric motors 58 or by other power sources.

FIGURE 11 shows sprockets 34 and 35 of unequal size showing that the lower run in this instance follows an inclined path due purely to the relative enlargement of the rear sprockets over the front sprockets. In this figure it will be noted that there is a fast depression of the mesh to its submerged position in the slab. For this arrangement the vibrators would preferably be located substantially in the depressing section and for a very short distance on the horizontal section where the balance of the depressing bars are moving in a fixed horizontal plane.

FIGURE 12 is also more or less schematic showing that a similar result can be accomplished with sprockets of substantially the same diameter where the axes of the rear sprockets are in a lower horizontal plane than the axes of the front sprockets. In this case there is a continuing inclination from the front to the rear portion of the lower runs of the depressing conveyors. In other words the mesh is now being depressed from a position beneath the front sprockets to a position beneath the rear sprockets practically over the entire fore and aft length of the installer whereby the depressing angle of the mesh is greatly reduced. This arrangement should preferably have vibration over the entire length of the base so that additional vibration units may advisably be added.

The arrangement shown in this FIGURE 12 would give somewhat greater flexibility and would permit simpler adjustment for varying depths of mesh depression and would be more economical to manufacture.

Figure 13:
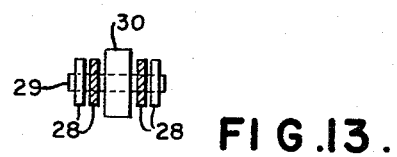
FIGURE 13 is a cross-sectional view taken on an enlarged scale through a chain and its roller pursuant to one form of the conveyor.
Figure 5:
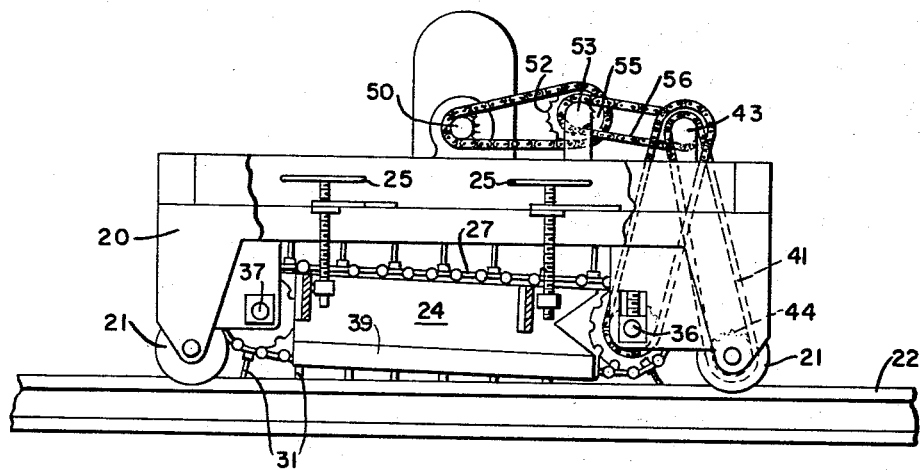
FIGURE 5 is a side elevational view similar to FIGURE 3 but with parts broken away and parts shown in section.

Referring more particularly to FIGURE 13, a section of the chain is shown with the enlarged rollers 30 positioned between the links 28 and mounted for rotation about the pivot pins 29. The rollers travel on the tracks and reduce friction of the chain dragging over the installing frames 24. Such chains would tend to sag in a catenary curve on the lower runs of the conveyors because they are held on the underside merely by the compressive action against the resistance of the concrete as the mesh is forced into the slab.

Figure 14:
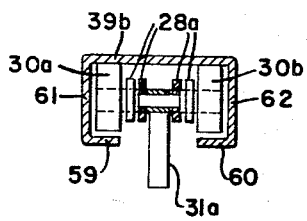
FIGURE 14 is a similar view showing a different form of chain conveyor employing two rollers and a channel retaining track.

FIGURE 14 illustrates an alternate construction which would eliminate any sagging of the conveyors along the lower runs. This FIGURE 14 shows a modified form of chain employing two rollers 30ª and 30ᵇ on the outer sides of the chain with the depressing bars 31ª mounted between the pairs of links 28ª. In this case the rollers 30ª and 30ᵇ are supported by inturned flanges 59 and 60 turned inwardly from enclosing side walls 61 and 62 of a channel form of retaining track 39ᵇ.

The flanges 59 and 60 are spaced apart so that, while supporting the weight of the chain and the depressing bars, such depressing bars 31ª are permitted to extend down into engagement with the mesh and to penetrate the slab. These flanges 59, 60 would maintain the chain in a direct or other line wholly or partially inclined as might be dictated by various circumstances. This arrangement would be most desirable if the setup as shown in FIGURE 12 is chosen.

The arrangement in all cases will insure that all the chains and rollers remain well above the top of the slab, even in the lowermost positions of the lower runs of the depressing conveyors.

Although I have disclosed herein the best forms of the invention known to me at this time, I reserve the right to all such modifications and changes as may come within the scope of the following claims.

What is claimed is:

1. A machine for installing reinforcing material in plastic concrete slabs comprising
   (a) reinforcing engaging means,
   (b) thrust means on the machine for moving the reinforcing engaging means in a direction to push the reinforcing material into the concrete slabs, means for moving the machine forwardly over the plastic slabs, and
   (c) retrograde means on the machine for moving the reinforcing engaging means rearwardly relatively to the machine at substantially the same rate of speed at which the machine is moving forward so that during installing thrust movement the reinforcing engaging means will not partake of the forward motion of the machine.

2. A machine for installing mesh material in plastic concrete slabs comprising
   (a) mesh engaging means mounted on the machine and having movement relatively to the machine in a direction to force the mesh material a predetermined distance below the surface of the plastic concrete slabs,
   (b) thrust means on the machine positioned to move said mesh engaging means in its installing movement, means for moving the machine forwardly over the plastic slabs, and
   (c) retrograde means on the machine carrying the mesh engaging means for moving the mesh engaging means rearwardly relatively to the machine at substantially the same rate of speed at which the machine is moving forward so that during installing thrust movement the mesh engaging means will not partake of the forward motion of the machine.

3. A machine for installing mesh material in plastic concrete slabs comprising
   (a) mesh engaging means movably carried by the machine,
   (b) motive means for driving the machine forwardly and means driving said engaging means rearwardly at substantially the same rates of speed, and
   (c) thrust means on the machine for moving the mesh engaging means into the plastic slab while such opposed directional movements are imposed on the mesh engaging means.

4. A machine for installing mesh material in plastic concrete slabs comprising means for moving the machine forwardly over the plastic slabs
   (a) mesh engaging means movably mounted to the machine in a continuously closed circuit in which the lower run of the circuit moves in a path which is at least in part inclined from a high point at the front to a low point rearwardly for exerting thrust on the mesh to move the mesh a suitable distance into the plastic slab, and (b) retrograde means for moving said mesh engaging means on the lower run thereof in a rearward direction at substantially the same rate of speed as the rate of forward movement of the machine along the roadway so that on the lower run of the circuit the mesh engaging means will be without forward movement but will develop only thrust downwardly against the mesh material in the direction of the slab.

5. A machine movable forwardly along the roadway for installing mesh material in plastic concrete slabs comprising means for advancing said machine forwardly (a) an endless conveyor movably mounted on the machine having an upper run traveling forwardly and a lower run traveling rearwardly with respect to the forward motion of the machine along the roadway and at the same speed, (b) mesh engaging means carried by and movable with conveyor, and (c) a track on the machine below which the lower run of the conveyor moves from front to rear, said track at least in a section thereof inclining from a higher point forwardly to a lower point rearwardly for creating thrust against the mesh engaging means in a direction to engage the mesh and depress such mesh below the surface of the plastic slab.

6. A machine for installing mesh material in plastic concrete slabs comprising means for moving said machine forwardly along the roadway (a) an endless conveyor having an upper run moving forwardly and a lower run moving rearwardly with respect to the forward movement of the machine at a rate of speed approximately that of the rate of speed of the machine incident to its forward movement along the roadway, (b) mesh engaging means carried by and movable with the endless conveyor, said conveyor including (c) front and rear sprockets in which the diameters of the rear sprockets are greater thus inducing a downward inclination from front to rear of the lower run of the conveyor with a consequent downward thrust imposed on the mesh engaging means.

7. A machine moving forwardly along the roadway for installing mesh material in plastic concrete slabs comprising (a) an endless conveyor mounted in an upright attitude on the machine having an upper run traveling forwardly and a lower run traveling rearwardly with respect to the forward movement of the machine along the roadway, (b) mesh engaging means carried by the conveyor for engaging mesh material laid on the concrete slabs, (c) thrust means associated with the lower conveyor run for moving the mesh engaging means downwardly and partially into the concrete slab to force the mesh thereinto, and (d) vibratory means associated with the lower conveyor run for communicating vibratory movement to the mesh installing means incident to its installing movement.

8. A machine movable forwardly along the roadway for installing mesh material in plastic concrete slabs comprising (a) an endless conveyor mounted on the machine having an upper run movable forwardly and a lower run movable rearwardly relatively to the forward motion of the machine along the roadway, (b) mesh engaging means carried by the conveyor, (c) thrust means for acting on the mesh engaging means in the lower run of the conveyor for developing downward thrust against the mesh to push the mesh into the plastic concrete, (d) motive means for driving the machine forwardly and continuously at a selected rate of speed, and (e) synchronizing means for driving the conveyor from the motive means at the same rate of speed as the rate of forward movement of the machine so that the mesh engaging means will move downwardly on its installing movement in a substantially straight path unaffected by the forward movements of the machine.

9. A machine movable forwardly along the roadway for installing mesh material in plastic concrete slabs comprising means for moving the machine forwardly (a) a main frame being a part of the machine, (b) at least one installing frame adjustable carried by said main frame, (c) an endless conveyor carried by the installing frame having upper and lower runs with the lower run traveling rearwardly in opposition to the forward movement of the machine and at the same rate of speed, (d) upper and lower tracks for the conveyor, (e) rollers forming parts of the conveyor movable against said tracks, (f) a plurality of mesh engaging members carried by said conveyor adapted to penetrate the slab while the conveyor and its rollers remain in spaced relation above the slab, the lower track being (g) at least partially declining from the front to rear and including (h) means for preventing the rollers from substantially rising or falling in respect of the track whereby to confine the lower run to prevent the same sagging into the plastic slab.

10. The process for the continuous installing of wire mesh material in plastic concrete slabs comprising (a) moving an installing machine continuously forward over the plastic slab, (b) while carrying an installing means forwardly with the machine, simultaneously moving the means rearwardly relatively to the machine at substantially the same rate of movement as the forward movement of the machine so that the installing means remains substantially stationary relatively to the mesh material and slab as respects fore and aft movement, and (c) forcing the installing means against the mesh material for pushing such material into the plastic slab and withdrawing said means while in the fore and aft stationary position.

11. The process for the continuous installing of wire mesh material in plastic concrete slabs comprising (a) moving at substantially uniform speed an installing machine carrying an installing means in a continuous forward direction over the plastic slab on which mesh material has been placed, (b) moving the installing means rearwardly relatively to the machine at substantially the same rate of speed as the forward speed of the machine, and (c) forcing the installing means against the mesh material for pushing the mesh material into the plastic slab.

12. The process for the continuous installing of wire mesh material in plastic concrete slabs comprising (a) moving at substantially uniform speed an installing machine carrying an installing means in a continuous forward direction over the plastic slab on which mesh material has been placed, (b) moving the installing means in a closed path with a lower run thereof moving in a direction substantially opposite to the forward movement of the machine and at substantially the same uniform rate of speed, and (c) forcing the installing means against the mesh material in the direction of the plastic slab to effect installation.

13. The process for the continuous installing of wire mesh material in plastic concrete slabs comprising (a) moving at substantially uniform speed an installing machine carrying an installing means in a continuous forward direction over the plastic slab on which mesh material has been placed,
(b) moving the installing means in an endless upright path with a lower run thereof moving at substantially the same uniform rate of speed as the machine but in the opposite direction, and
(c) forcing the installing means against the mesh material in the direction of the plastic slab.

References Cited by the Examiner
UNITED STATES PATENTS

| | | | |
|---|---|---|---|
| 1,996,153 | 4/1935 | Heltzel | 94—39 |
| 2,187,879 | 1/1940 | Johnson | 94—39 X |
| 2,389,773 | 11/1945 | Golden | 94—39 |

JACOB L. NACKENOFF, *Primary Examiner.*